United States Patent [19]

Brammeier

[11] Patent Number: 5,495,128
[45] Date of Patent: Feb. 27, 1996

[54] WIND POWERED GENERATOR

[76] Inventor: Fred L. Brammeier, P.O. Box 802, Wilton, Iowa 52778

[21] Appl. No.: 320,244

[22] Filed: Oct. 11, 1994

[51] Int. Cl.[6] .............................. F03D 9/00; F01D 15/10; F03B 13/00
[52] U.S. Cl. .............. 290/55; 290/4 R; 290/52; 290/54
[58] Field of Search ............... 290/4 D, 44, 55, 290/4 R; 415/2.1, 4.1, 4.3, 4.5, 62; 416/9, 11

[56] References Cited

U.S. PATENT DOCUMENTS

| 59,828 | 11/1866 | Fay | 415/4.1 |
|---|---|---|---|
| 823,404 | 6/1906 | Fuller . | |
| 981,077 | 1/1911 | Feldner | 415/4.5 |
| 1,247,520 | 11/1917 | Fessenden | 290/4 D |
| 1,300,499 | 4/1919 | Slagel | 415/2.1 |
| 1,596,373 | 8/1926 | Preston | 415/2.1 |
| 1,633,428 | 6/1927 | Zgliczynski . | |
| 3,944,839 | 3/1976 | Carter | 290/55 |
| 4,220,870 | 9/1980 | Kelly | 290/44 |
| 4,265,086 | 5/1981 | Bahrenburg | 60/398 |
| 4,280,061 | 7/1981 | Lawson-Tancred | 290/55 |
| 4,441,872 | 4/1984 | Seale | 290/44 |
| 4,447,738 | 5/1984 | Allison | 290/44 |
| 4,495,424 | 1/1985 | Jost | 290/53 |
| 4,496,846 | 1/1985 | Parkins | 290/44 |
| 4,496,847 | 1/1985 | Parkins | 290/44 |
| 4,498,017 | 2/1985 | Parkins | 290/44 |
| 4,525,631 | 6/1985 | Allison | 290/4 R |

FOREIGN PATENT DOCUMENTS

| 2300235 | 9/1976 | France | 415/2.1 |
|---|---|---|---|
| 3723890 | 2/1989 | Germany | 415/2.1 |
| 192793 | 2/1923 | United Kingdom | 415/2.1 |

*Primary Examiner*—Steven L. Stephan
*Assistant Examiner*—Christopher Cuneo
*Attorney, Agent, or Firm*—James Nemmers

[57] ABSTRACT

An electrical power generating system that uses wind power to drive hydraulic pumps or motors that in turn drive electrical generators. The system uses a plurality of squirrel-cage type fans or turbines arranged with their axes in different intersecting planes to more efficiently utilize the wind. The wind turbines are mounted on a partially enclosed supporting structure that directs the wind for the most efficient use of the turbines, and the entire unit is rotatable about a pivot support so that the unit can swing through a full circle to orient itself to the wind direction.

3 Claims, 5 Drawing Sheets

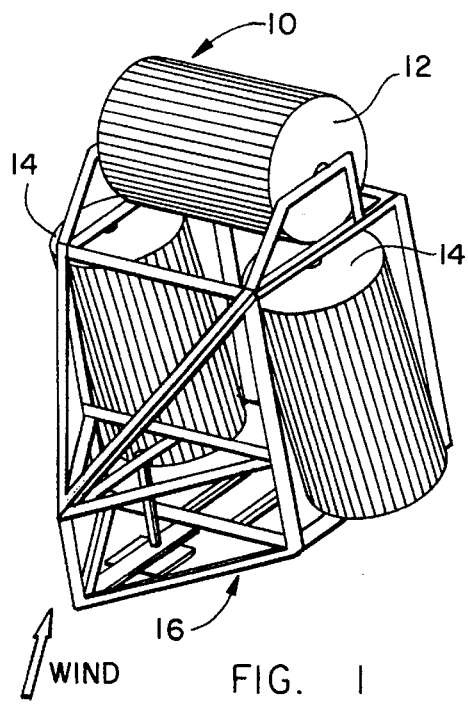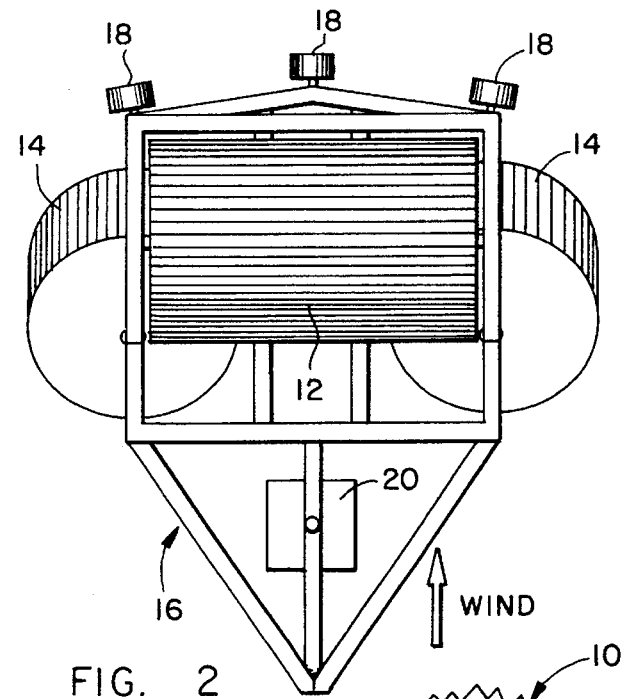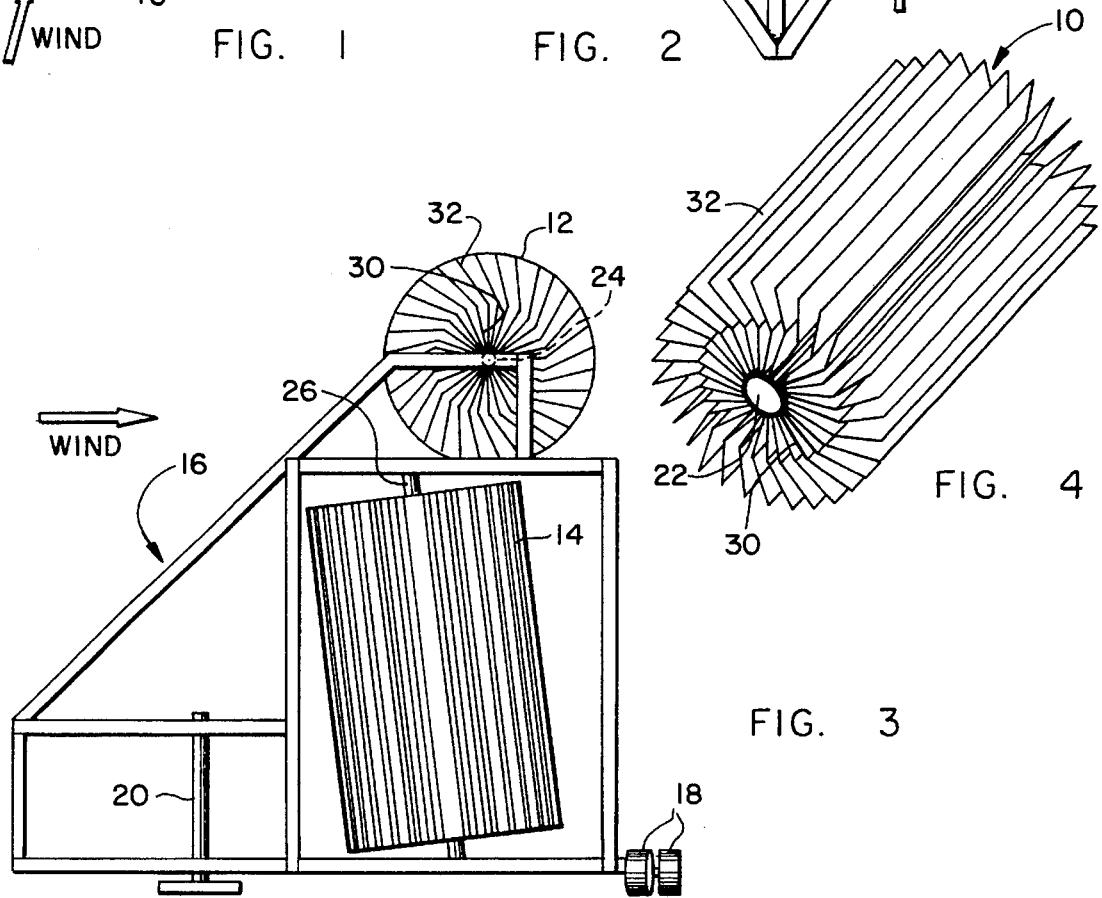
FIG. 1
FIG. 2
FIG. 3
FIG. 4

WIND POWERED GENERATOR

BACKGROUND OF THE INVENTION

Because of environmental concerns and concerns regarding long term availability of other energy sources, the use of wind as a source of energy for electrical generation has become a more probable source, especially if wind powered generators can be made more efficient. Wind power has been utilized for many, many years to drive water pumps and electrical generators in rural areas where electrical power was not available. More recently, experimental commercial wind generating plants have been developed, and in some instances are being tested in pilot projects. A number of systems and types of generators have been designed, some of which systems and generators employ hydraulic motors that in turn drive electrical generators or alternators to produce electrical power. However, the known systems are expensive, must be installed on hilltops and do not utilize the wind power to the greatest degree of efficiency. In most instances, the wind generators known to date must be mounted on relatively tall towers which not only increases the expense but also results in a rather unsightly installation. Therefore, there is a need for improved wind powered generation systems that more efficiently utilize the available wind power. There is a further need for the development of such systems that can be produced and installed at a relatively low cost and which minimize any detraction from the beauty of the surrounding countryside.

SUMMARY OF THE INVENTION

The wind powered generator of this invention utilizes a plurality of squirrel-cage type fans or turbines all mounted on a wedge-shaped, partially enclosed structure with one or more of the turbines rotating about a substantially horizontal axis while others of the turbines are rotatable about substantially vertically oriented axes. Each of the turbines is connected to a hydraulic pump that is in turn connected in a system in which a hydraulic motor drives an electrical generator or alternator. The entire unit containing the turbines is mounted about a vertical pivot so that it can orient itself to the wind direction. Enclosure of the supporting structure provides for the most efficient utilization of the available wind currents.

BRIEF DESCRIPTION OF THE DRAWING

FIG. 1 is a perspective view showing a unit constructed according to the principles of the invention;

FIG. 2 is a top or plan view of the unit of FIG. 1;

FIG. 3 is a side elevational view of the unit of FIGS. 1 and 2;

FIG. 4 is a perspective view of a typical squirrel-cage type of turbine that forms a part of the invention;

DESCRIPTION OF THE PREFERRED EMBODIMENT OF THE INVENTION

Figure 5:
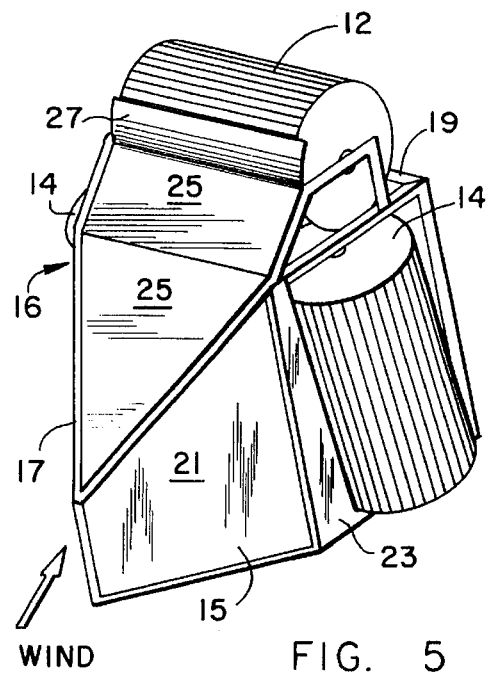
FIG. 5 is a view similar to FIG. 1 but showing the unit partially enclosed.

In FIGS. 1, 2 and 3, there is illustrated a unit having three squirrel-cage type fans or turbines each indicated generally by the reference numeral 10. One turbine 12 is mounted for rotation about a substantially horizontal axis while a pair of turbines 14 are mounted for rotation about a substantially vertical axis. It should be understood that while a module of three turbines 10 has been shown for purposes of simplicity, that the principles of the invention can be utilized for units containing a plurality of horizontal turbines 12 and a plurality of vertical turbines 14, all arranged in a generally wedge-shaped configuration when viewed from the side and in a generally wedge or triangular-shaped configuration when viewed from the top. In other words, a unit constructed according to the principles of the invention may contain vertical turbines 14 grouped in sets that are spaced apart from front to rear and which increase in height as the distance from the pivot point 20 increases thus forming a wedge-shaped configuration when viewed from the side. In this arrangement, one or more horizontal turbines 12 are positioned above and between the vertical turbines 14 with the number of turbines 12 increasing as the distance increases from the pivot point 20, thus forming a wedge-shaped configuration when viewed from the top. In any configuration, the turbines 12 and 14 are mounted on a supporting structure 16 with the vertical turbines 14 positioned along the sides 15 and 17 of the structure 16 and the horizontal turbines 12 positioned along the top 19 of the structure 16.

Figure 6:
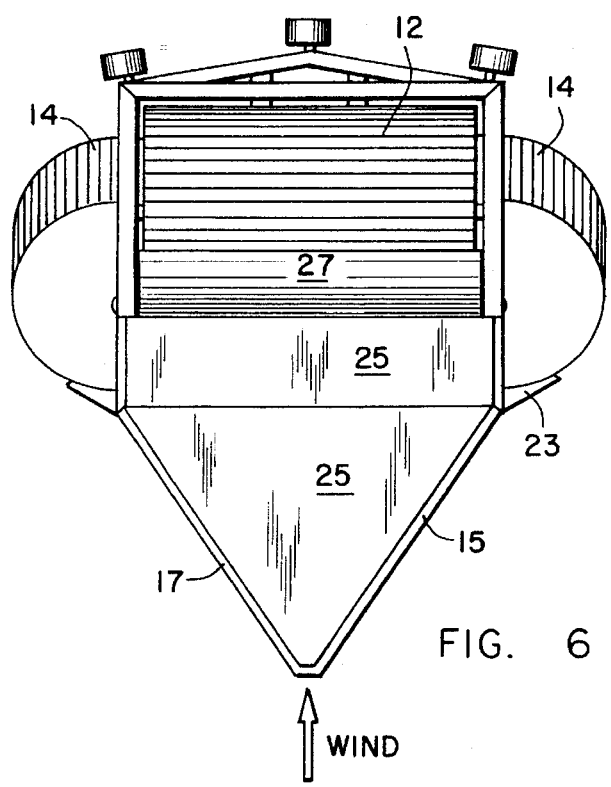
FIG. 6 is a view similar to FIG. 2 but showing the unit partially enclosed.
Figure 7:
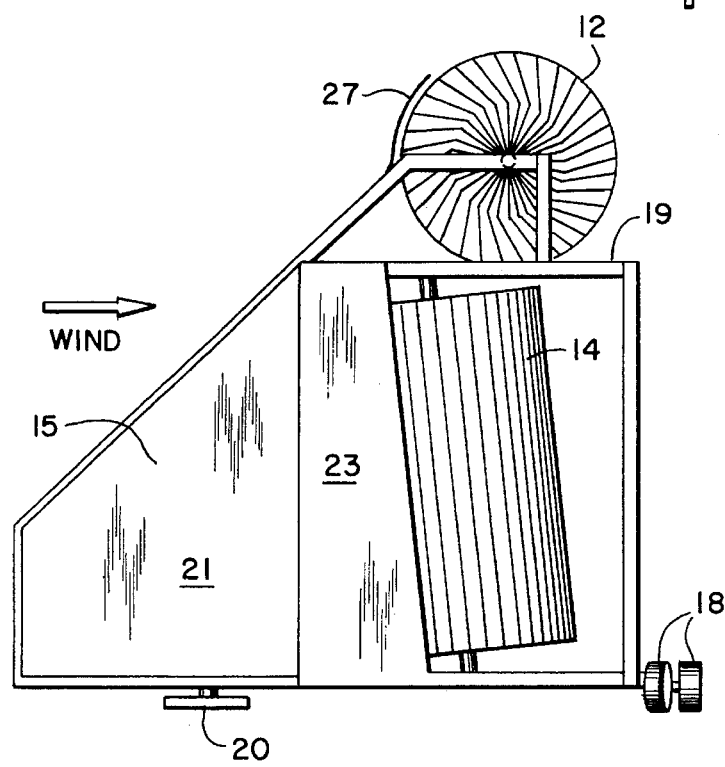
FIG. 7 is a view similar to FIG. 3 but showing the unit partially enclosed.

FIGS. 1, 2 and 3 show the unit as fully open; in other words, the sides 15 and 17, the top 19 and the bottom are not covered. FIGS. 5, 6 and 7 illustrate that it is preferred to have a side panel 21 covering the side 15 and extending partially over the vertical turbine 14 as shown at 23, and a top panel 25 covering the top 19 and having a shield 27 that extends partially over the horizontal turbine 12. The bottom of the structure 16 is also preferably covered with a panel (not shown). This construction of partially enclosing the structure 16 directs the wind into the turbines 10 in a more efficient manner than the fully open construction and creates an open area within the center of the structure 16 between the turbines 12 and 14, which open area creates less resistance to rotation by relieving the drag portion of the revolutions created as the turbines rotate.

The entire supporting structure 16 is mounted on wheels 18 and a vertical pivot support 20 so that the entire unit can revolve around the pivot support 20 to orient itself to the wind direction for maximum efficiency. For this purpose, wheels 18 preferably rest upon a hard surface such as a paved circular path with the vertical pivot 20 securely fixed to the ground so as to maintain the wheels 18 on the path.

The drawings show the vertical turbines 14 each to be mounted on an axis that is tilted slightly from the vertical.

This lessens the pressure on the bottom thrust bearings (not shown), but it should be understood that the axis of rotation of the vertical turbines 14 can be vertical or slightly off vertical depending upon the particular design lay out and to avoid interference of the various additional components that comprise the wind powered generator of the invention. However, the vertical turbines 14 are mounted so as to be rotatable about substantially vertical axes.

Each of the turbines 10 has two hubs 22 (see FIG. 4), one at each end. Each of the horizontal turbines 12 is rotatable about a shaft 24 while vertical turbines 14 rotate on shafts 26. Each of the shafts 24 and 26 is supported on and turnable in suitable bearings (not shown), and each shaft 24 and 26 is operatively connected to a hydraulic pump (see FIG. 13). For simplicity, hydraulic pumps 28 are not shown in FIGS. 1, 2 and 3, but it should be understood that they would be mounted on the supporting structure 16 at the outer ends of shafts 24 or 26 as the case may be.

Each of the turbines 10 has a plurality of blades with an inner set of blades 30 and an outer set of blades 32. The inner blades 30 may extend on radial lines or may be offset from radial lines at an acute angle preferably less than 20°. The outer blades are each connected in a suitable manner to the outer ends of a respective one of the inner blades 30, and extend at an angle to the inner blades as shown. Outer blades 32 may be welded or otherwise suitably connected to the inner blades 30. Although not shown in the drawings, it should be understood that each of the turbines 10 could also have cone-shaped ends at each of the outer ends. In either event, sets of inner blades 30 and outer blades 32 present a turbine that is rotatable under even a wind of a low velocity from any direction. As will be evident to those skilled in the art, the shafts 24 and 26 are mounted for rotation in low friction bearings or other suitable means to provide for free rotation of the turbines 10.

Because the turbines 10 are arranged with the vertical turbines 14 and horizontal turbines 12 mounted on axes that are in intersecting planes, and because of the wedge shape of the structure, winds of even a slight velocity from any direction will cause the turbines to rotate. Also, the entire unit itself will revolve around the vertical pivot support 20 as the wind direction changes so as to most efficiently utilize the available wind power.

Figure 8:
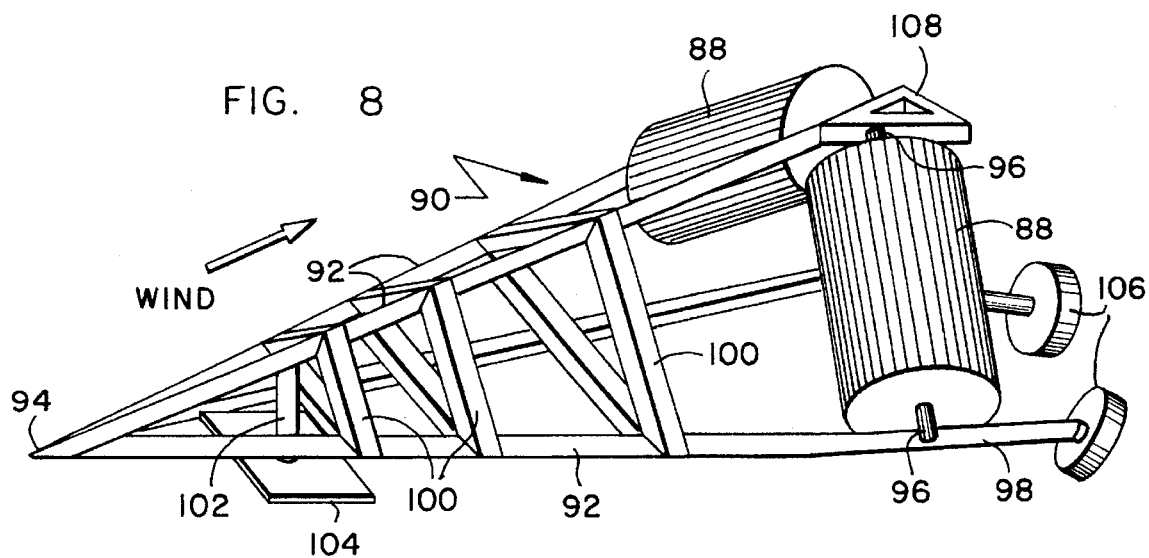
FIG. 8 is a perspective view of another embodiment of the invention.
Figure 9:
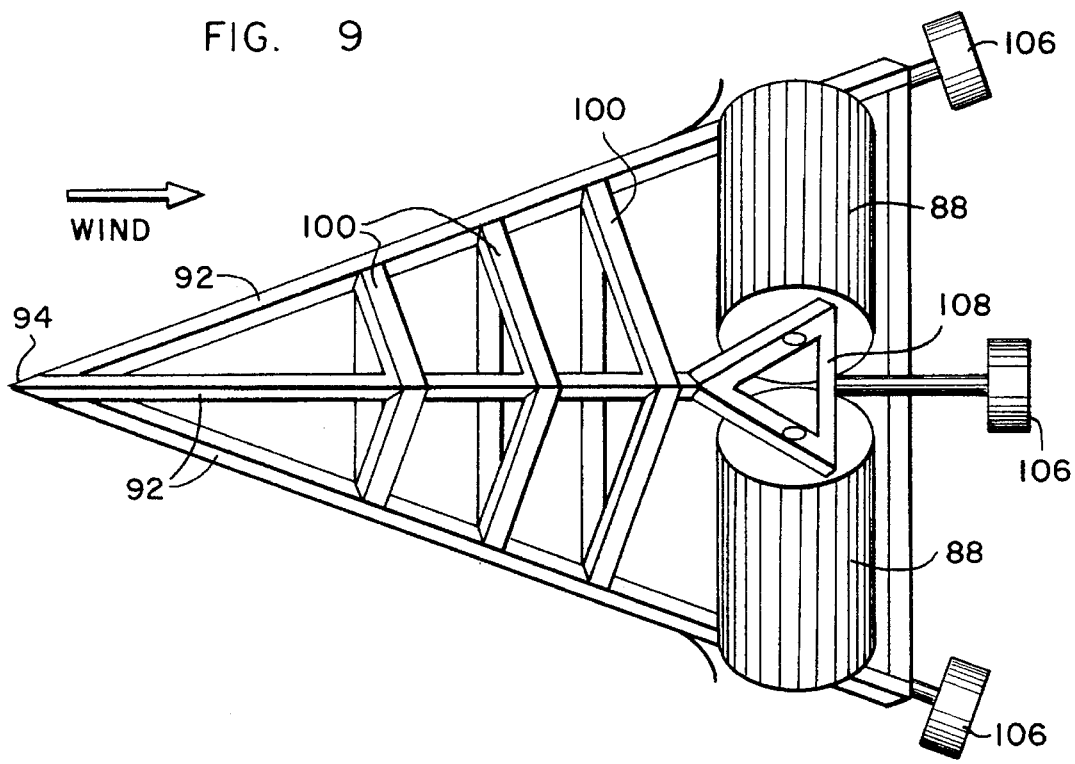
FIG. 9 is a top or plan view of the embodiment of FIG. 8.

Referring now to FIG. 8, another embodiment of the invention is shown in which a pair of turbines 88 are mounted on a triangular shaped frame indicated generally by the reference numeral 90. The frame 90 has longitudinally extending members 92 that are joined at the apex 94 at the rear of the frame 90. Turbines 88 are mounted on shafts 96 at the forward end 98 of the frame 90 which is the base of the triangle. The frame 90 also includes a plurality of cross braces 100 as shown. In addition, the frame is mounted for pivotal movement about a vertical pivot support 102 secured to a base plate 104 that will rest on the ground. The forward end 98 of the frame 90 is supported on wheels 106. The turbines 88 are preferably of the squirrel-cage type similar to those shown in FIG. 4 with their shafts 96 secured to a support frame 108.

Figure 10:
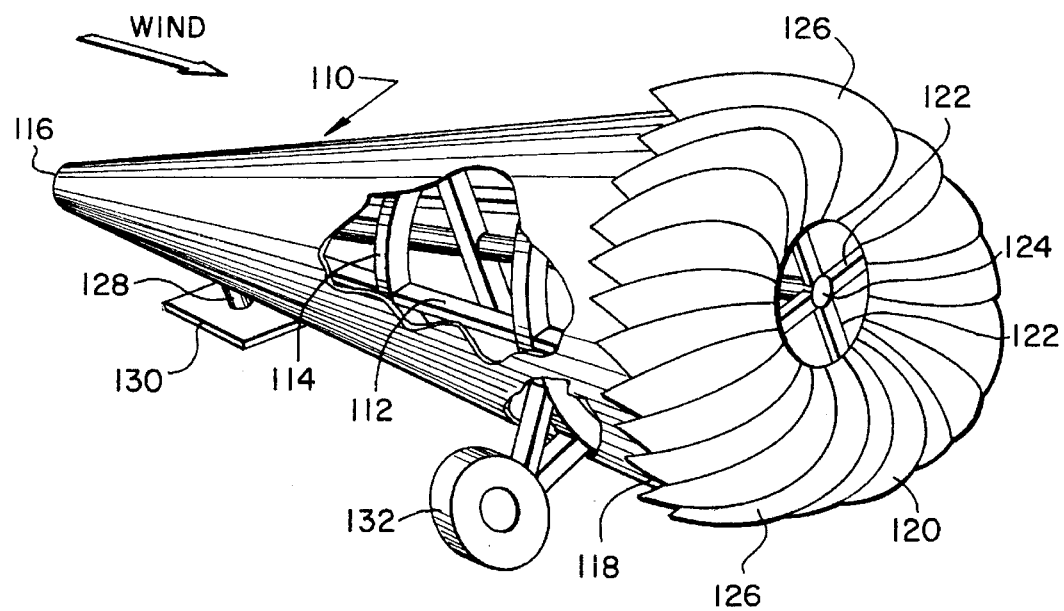
FIG. 10 is a perspective view of yet another embodiment of the invention showing a single turbine mounted at the forward end of the unit.
Figure 11:
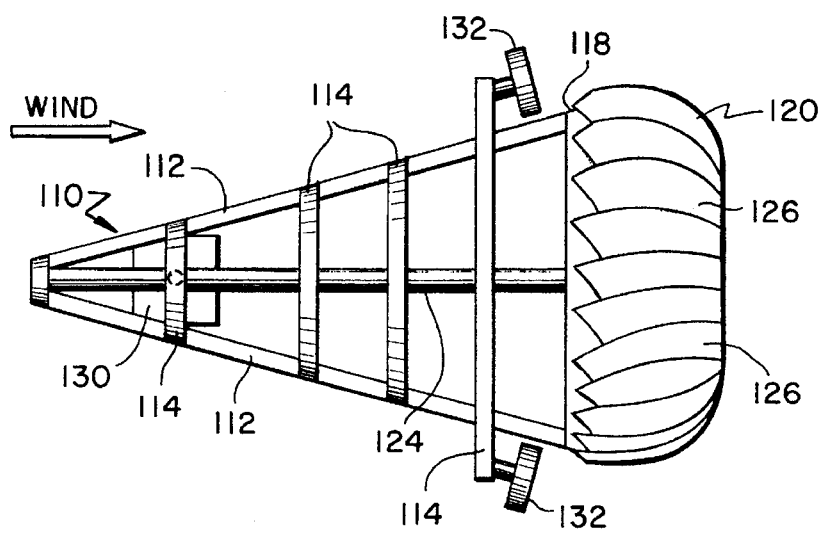
FIG. 11 is a top or plan view of the embodiment of FIG. 10.
Figure 12:
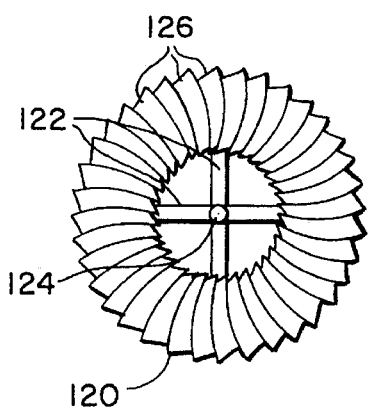
FIG. 12 is a front elevational view of the turbine of the embodiment of FIGS. 10 and 11.

Referring now to FIGS. 10, 11 and 12, there is shown yet another embodiment of the invention. In this embodiment, the frame structure 110 is conical shaped, the frame structure 110 including longitudinal members 112 to which are connected circular frame members 114. The longitudinal members 112 terminate at the apex 116 of the conical shaped frame structure 110 which forms the rear of the structure. At the forward end 118 there is mounted for rotation a turbine 120 which is supported on cross supports 122 that are in turn affixed to shaft 124 that extends longitudinally of the frame structure 110. The blades 126 of the turbine 120 are curved and mounted so as to form an annular ring. Similar to the other embodiments, the frame structure 110 has a vertical pivot support 128 resting on a base plate 130 that is supported on the ground. Wheels 132 extend from the frame structure 110 near the forward end 118.

Figure 13:
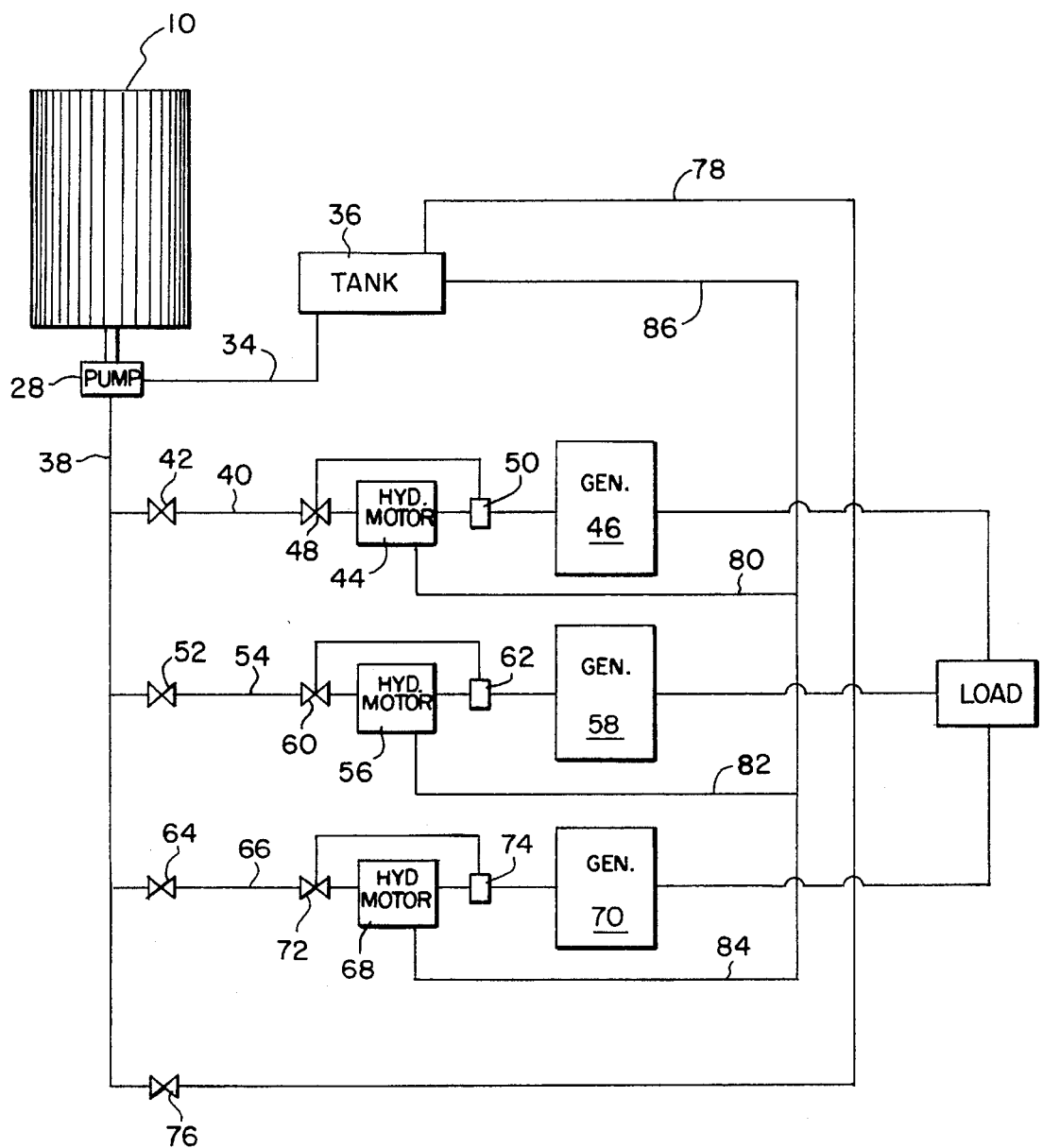
FIG. 13 is a schematic diagram of the hydraulic system for generating electric power using units constructed according to the principles of the invention.

Referring now to FIG. 13, there is illustrated a schematic of the hydraulic system for driving electrical generators or alternators to produce electrical power. FIG. 13 shows only a single turbine 10 and hydraulic pump 28, but it should be understood that a hydraulic pump 28 for each of the turbines 10 will be connected into the hydraulic system. Hydraulic pump 28 is connected in a supply line 34 from a source of hydraulic fluid such as tank 36. As turbine 10 rotates, it will drive hydraulic pump 28 and create pressure in the high pressure hydraulic line 38. Pressure will also be created in line 40 containing a first pressure valve 42 which will open upon a predetermined pressure being created in line 38. When valve 42 opens, hydraulic pressure will be created in line 40 downstream from valve 42 to drive a first hydraulic motor 44 which in turn drives the first generator 46. The flow of hydraulic pressure in line 40 downstream from the valve 42 is also controlled by a flow control valve 48 which is operated by an RPM governor 50 connected to the hydraulic motor 44. As the wind velocity increases and drives the turbines 10 at a higher speed, hydraulic pumps 28 will produce a higher pressure in high pressure line 38, and when a predetermined pressure is attained, which pressure is higher than the predetermined pressure at which pressure valve 42 will open, a second pressure valve 52 in line 54 will open to drive a second hydraulic motor 56 and generator 58. Flow control valve 60 controlled by RPM governor 62 is also preferably employed similar to RPM governor 50 and flow control valve 48.

If desired, a third pressure valve 64 can be employed in lines 66, which third pressure valve 64 is set to open at a higher pressure than the predetermined set pressure of valve 52. The higher pressure will be created in the high pressure line 38 whenever the wind velocity increases and drives the turbines 10 at an even higher speed of rotation, thus driving the hydraulic pumps 28 at higher speeds. There is also included in line 66 hydraulic motor 68 which drives a generator 70 and a flow control valve 72 controlled by RPM governor 74. With the foregoing arrangement, as the wind velocity increases or decreases, generators 46, 58 and 70 will be powered or not powered depending upon the pressure created in the high pressure line 38 and the preset pressures of the pressure valves 42, 52 and 64. The high pressure line 38 also contains high pressure valve 76 which is set to open a predetermined pressure higher than the preset pressure of valve 64 to allow the excess pressure to return to the tank 36 through the return line 78. Similarly, each of the hydraulic motors 44, 56 and 68 are connected by return lines 80, 82 and 84, respectively, to the tank 36 through another return line 86 to form the closed hydraulic system.

The foregoing system has been described to drive generators which can be direct current generators, or alternators producing alternating current. Depending upon the specific use for the system of the invention, the current produced can be introduced directly into an existing power system through the use of synchronizers. Obviously, the unit can also be used to directly drive or power specific pieces of equipment. Small units, for example, might be utilized to drive specific items of equipment in rural areas which are not easily powered from a central power system.

For purposes of simplicity, the principles of the invention have been described in connection with a small module utilizing two vertical turbines 14 and a single horizontal turbine 12. Depending upon the amount of power to be produced and the location of the unit where it can capture an increased amount of wind, additional modules and arrangements of turbines can be employed utilizing the principles of the invention. As previously indicated, the arrangement should be such that the turbines are arranged in a wedge shape with increasing number of turbines as the distance from the pivot support 20 increases. For example, there might be stacks of three vertical turbines along each side of stacks of three pairs of horizontal turbines, the number of turbines increasing as the distance from the pivot support 20 increases. It is important however that regardless of the number of modules or the specific arrangement of the turbines, that they be arranged in a wedge shape, and spaced apart and open to receive the wind in the most efficient manner to produce maximum rotation of the turbines. It is also important that the entire unit be mounted about a pivot point so that the unit can orient itself to the wind direction as the direction changes. In all configurations, each turbine would independently drive a hydraulic pump which would be connected in the basic hydraulic system to drive one or more generators or alternators as previously described. Depending upon the particular selection of the size of the generators or alternators, there may be more generators than turbines or vice versa.

In any event, my invention produces a wind powered generating system that will most efficiently utilize the available winds. Since it utilizes wind only, it will not deplete the available sources of fuels nor in any way pollute the environment. Especially in certain areas of the world, winds, although variable in velocity, are almost constant, and if the unit of the invention is properly located, it can be an efficient and economical source of producing electrical power.

Having thus described the invention in connection with a preferred embodiment thereof, it will be evident to those skilled in the art that various revisions and modifications can be made to the preferred embodiments described herein without departing from the spirit and scope of the invention. It is my intention, however, that all such revisions and modifications that are obvious to those skilled in the art will be included within the scope of the following claims.

What is claimed is as follows:

1. A power generating system utilizing air movement produced by wind, said system comprising a turbine support structure, a first turbine mounted on the support structure for rotation about a substantially horizontal axis, a second turbine mounted about a substantially vertical axis, a third turbine mounted for rotation about a substantially vertical axis, first, second and third hydraulic pumps operatively connected to and driven respectively by the first, second and third turbines, a source of hydraulic fluid supplying hydraulic fluid to said pumps through a closed-loop hydraulic line, a first hydraulic motor in said hydraulic line, a first valve in said hydraulic line between the first hydraulic pump and first hydraulic motor, said first valve being opened upon a first predetermined pressure being reached in the hydraulic line to drive the first hydraulic motor when said first predetermined pressure is reached, a second valve in said hydraulic line between the second hydraulic pump and second hydraulic motor, said second valve being opened upon a second predetermined pressure being reached in the hydraulic line which second pressure is higher than the first pressure thereby driving the second hydraulic motor when said second predetermined pressure is reached, a third valve in said hydraulic line between the third hydraulic pump and third hydraulic motor, said third valve being opened upon a third predetermined pressure being reached in the hydraulic line which third pressure is higher than the second pressure thereby driving the third hydraulic motor when said third predetermined pressure is reached, and electric generating means operatively connected to said first, second and third hydraulic motors to produce electrical power when one or more of said hydraulic motors are operating.

2. A power generating apparatus utilizing air movement produced by wind, said apparatus comprising a turbine support structure having a forward end and a rear end, a pivot support near the rear end of the turbine support structure, the turbine support structure having sides diverging away from the pivot support and terminating near the forward end to form a generally wedge-shaped construction, said turbine support structure also having a bottom extending between the two sides and also having a top, said two sides of the support structure extending upwardly from the bottom and converging toward each other and joining and terminating at the top of the support structure to form a generally triangular shaped structure, at least one ground-engaging wheel mounted on the supporting structure near the forward end to provide for circular movement of the apparatus around the pivot support as the wind direction changes, a first turbine mounted on the support structure near the forward end for rotation about an axis, said turbine being mounted on one of said sides for rotation about an axis between vertical and horizontal, a second turbine mounted on the other of said sides near the forward end of the support structure for rotation about an axis between vertical and horizontal, and a hydraulic pump operatively connected to and driven by each of the first and second turbines.

3. A power generating apparatus utilizing air movement produced by wind, said apparatus comprising a turbine support structure having a forward end and a rear end, a pivot support near the rear end of the turbine support structure, the turbine support structure having sides diverging away from the pivot support and terminating near the forward end to form a generally wedge-shaped construction, said turbine support structure also having a top and a bottom extending between the two sides, a first turbine mounted on the support structure near the forward end for rotation about an axis that is substantially horizontal, a second turbine mounted along one of the two sides for rotation about a substantially vertical axis, a third turbine mounted along the other of the two sides for rotation about a substantially vertical axis, each of the first, second and third turbines being squirrel-cage type turbines having a plurality of blades extending generally in a radially outward direction, the said blades of the first, second and third turbines being comprised of a set of inner blades extending generally in a radially outward direction and a set of outer blades, one for each of the inner blades, which outer blades are connected to the inner blades with each outer blade extending outwardly at an acute angle to the inner blade to which it is connected, at least one ground-engaging wheel mounted on the supporting structure near the forward end to provide for circular movement of the apparatus around the pivot support as the wind direction changes, and a hydraulic pump operatively connected to and driven by each of said turbines.

\* \* \* \* \*